INVENTOR
DONALD L. FERRIS
BY Vernon F. Hauschild
ATTORNEY

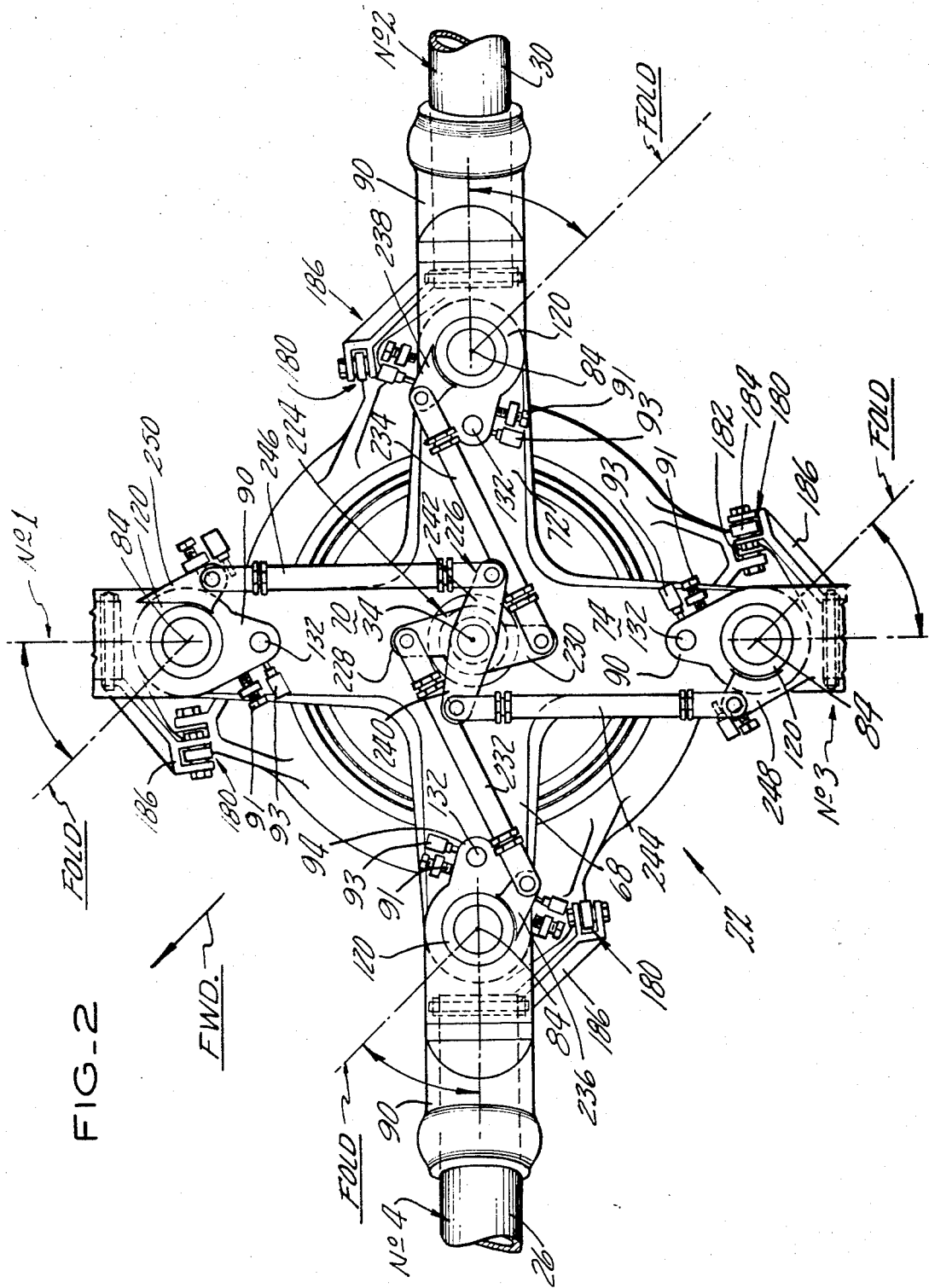

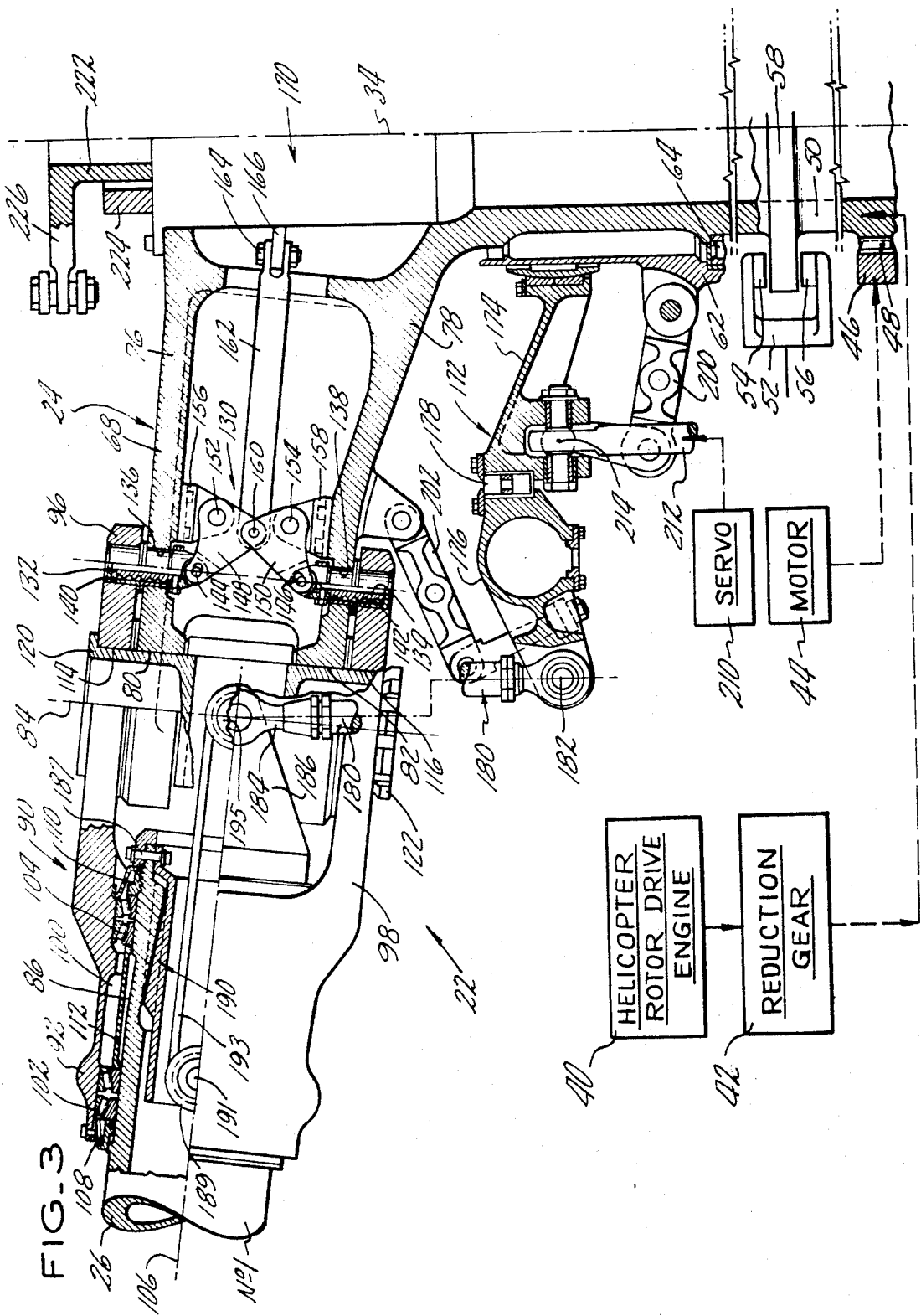

United States Patent Office 3,438,447
Patented Apr. 15, 1969

3,438,447
DUAL LINEAR OUTPUT AND DUAL ROTARY OUTPUT ACTUATOR WITH REDUNDANT DRIVE
Donald L. Ferris, Newtown, Conn., assignor to United Aircraft Corporation, East Hartford, Conn., a corporation of Delaware
Filed Oct. 12, 1967, Ser. No. 674,881
Int. Cl. B63h 1/22; B64c 11/28, 27/50
U.S. Cl. 170—160.12                            14 Claims

ABSTRACT OF THE DISCLOSURE

An actuator having a redundant drive and producing at least four outputs sequentially including a first linear output, a first rotary output, a second linear output and a second rotary output.

Background of the invention

This invention relates to an actuator which provides dual linear output motion and dual rotary output motion and which has redundant input mechanism, and more particularly to such an actuator which produces sequentially, a first linear output, a first rotary output, a second linear output, and a second rotary output.

Such an actuator is needed in retracting helicopter rotor blades sequentially so as to provide a synchronous blade pattern on opposite sides of the helicopter centerline during the folding and unfolding operation. Helicopter blades are normally locked against folding and this lock must be released before the helicopter blades may be folded. In the past, blade folding of helicopter rotors has presented no particular problem because the folding was done on the ground for purposes of providing better storability of the helicopter in hangars and in other storage areas. A requirement has arisen recently, however, where blade folding must be accomplished in flight for use on convertiplanes, for example. Under these circumstances, the helicopter rotor must first be stopped, then brought to a desired position, and then the blades must be sequentially folded so as to avoid blade-to-blade or blade-to-fuselage interference during the folding operation. It is accordingly the purpose of this actuator to provide for the releasing of the anti-fold blade locks on a first blade plurality, then providing a rotary motion to fold this first plurality of blades, then providing a linear motion to unlock the anti-fold blade locks on the second blade plurality, and then providing a rotary motion to fold said second blade plurality.

In the actuator art, no such actuator is presently known.

Summary of invention

A primary object of the present invention is to provide an actuator which is capable of sequentially providing a first linear motion output, a first rotary motion output, a second linear motion output, and a second rotary motion output.

In accordance with the present invention, this actuator also includes redundant input provisions and is capable of providing a fifth output of either linear or rotary motion.

In accordance with this invention, the actuator includes a planetary gear system including a sun gear, a plurality of double geared planetary gears or pinions, and a ring gear. The ring gear is connected through a lost motion connection to a first rotary output shaft and which pinion is connected to a second rotary output shaft which is initially locked in position. As the first redundant input drive drives the sun gear and hence the pinion gears and hence the ring gear through its lost motion movement, the ring gear serves to provide the first linear motion output and, when this lost motion movement is used up, the ring gear then drives the first rotary output shaft to produce the first rotary output. The first rotary output shaft is associated with or includes cam-type mechanism to produce the second linear output motion and this motion may be used to unlock the second rotary shaft. Apparatus is included to eventually fix the first rotary output shaft and hence the ring gear in fixed position, thereby causing the sun gear and the pinion gears to act against the fixed ring gear to drive the second rotary output shaft to produce the second rotary output. There is a redundant input mechanism which is a gear member connected to drive the pinions so as to produce the four motions in the sequence and in the fashion just described. In addition, the second rotary output shaft also includes a jackscrew provision to provide a fifth output of the rotary type which, in conventional fashion, may be converted to a linear output.

Brief description of the drawing

FIG. 2 is a plan view of a helicopter rotor head utilizing this invention.

FIG. 3 is a cross-sectional elevation view of a helicopter rotor head utilizing this invention.

Description of the preferred embodiment

Figure 1:
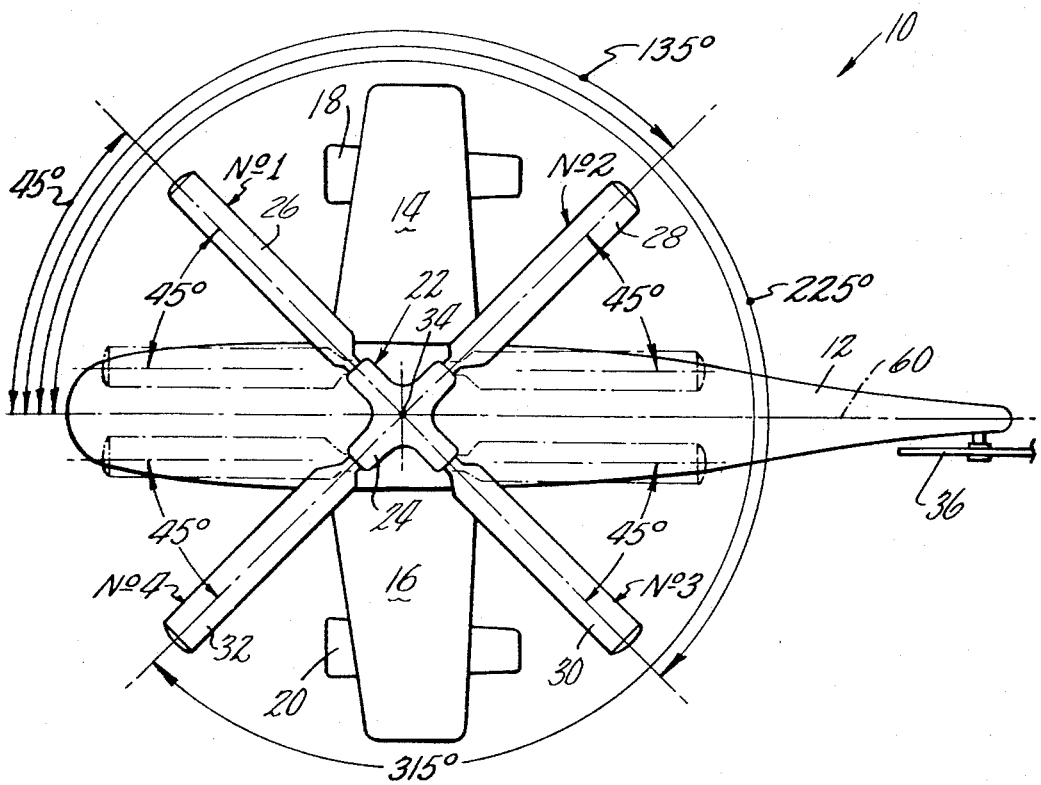
FIG. 1 is a plan view of a convertiplane utilizing this invention.

Referring to FIG. 1 we see convertiplane 10 which is capable of both the helicopter mode of operation and the fixed-wing mode of operation and conversion therebetween in flight. Convertiplane 10 comprises fuselage 12, opposed fixed wings 14 and 16, which may support piston, turboprop or turbojet engines 18 and 20. Helicopter lift rotor 22 projects upwardly from and is supported for rotation by fuselage 12 and includes hub assembly 24 from which blades 26, 28, 30 and 32 project for rotation therewith about axis of rotation 34. These helicopter blades are mounted on hub assembly 24 so as to be foldable with respect thereto between their operable position shown in solid lines in FIG. 1 and their folded or stowed position shown in phantom lines in FIG. 1. Anti-torque rotor 36 rotates in cooperation with helicopter lift rotor 22 to combat the torque imposed upon fuselage 12 by rotor 22.

When convertiplane 10 is operating in the fixed-wing mode of operation, helicopter rotor 22 is in its stowed position shown in phantom lines in FIG. 1 and the retracted helicopter rotor is covered in some way by appropriate canopy arrangements to present minimum drag as engines 18 and 20 serve to provide the forward propulsive force for fixed-wing operation. Engines 18 and 20 may also be mounted in fuselage 12.

During helicopter mode of operation of convertiplane 10, the helicopter lift rotor 22 has its blades 26–32 unfolded to their operable position shown in solid lines in FIG. 1 and rotor 22 is then driven either by appropriate connections with engines 18 and/or 20 or by a third engine 40 illustrated schematically in FIG. 3 and shown to be coacting with reduction gear 42. Engine 40 and reduction gear 42 may be of any appropriate type, for example, of the type shown in U.S. Patent Nos. 2,711,631; 2,747,367; 2,426,879 and 2,979,968.

This invention is particularly concerned with the helicopter lift rotor and has particular applicability to smooth transition between the helicopter mode of operation and the fixed-wing mode of operation in flight. This requirement occurs, for example, when convertiplane 10 has been operating in helicopter mode while making a rescue recovery and then wishes to return at a rapid rate to a base area. During this helicopter-to-fixed-wing mode transition, a combination of helicopter blade pitch variation and rotor braking are employed to bring rotor 22 to a stopped position. With rotor 22 so stopped, motor 44 (see FIG. 3), through rack 46 and gear 48 which is a ring gear forming a part of rotor drive shaft 50, drives rotor 22 to the position shown in solid lines in FIG. 1. Disc-brake assembly 52, which includes pucks 54 and 56 which are solenoid operated by the pilot to bear against brake ring 58 which projects from and may form part of rotor shaft 50, then positively positions rotor 22 in its FIG. 1 solid lines position. It is important to note that with the helicopter rotor 22 in this stopped selected position, the centerline of blade 26 forms substantially a 45° angle of azimuth with the helicopter fore-and-aft centerline 60, while blade 28 forms an azimuth angle of 135° therewith, while blade 30 forms an azimuth angle of 225° therewith, and while blade 32 forms an azimuth angle of 315° therewith.

Blades 26–32 will hereinafter be referred to as blades 1–4, respectively.

It will be noted that with blades 1–4 in their solid line FIG. 1 position, a symmetric blade pattern is presented on opposite sides of helicopter fore-and-aft centerline 60 and it will be noted that, as is fully described hereinafter, this symmetric blade pattern on opposite sides of centerline 60 remains as blades 1–4 are moved from their operable position shown in solid lines in FIG. 1 and their stowed position shown in phantom lines in FIG. 1. As described hereinafter, blades 1–4 fold synchronously through an angle of 45°, either in unison or sequentially in diametrically opposed pairs, between their operating condition and their folded condition. It will further be noted that blades 1 and 3 rotate in the same arcuate direction while blades 2 and 4 rotate in the same arcuate direction but the opposite arcuate direction from blades 1 and 3. This continuous symmetric blade pattern during transition is important so as not to adversely affect the stability of convertiplane 10.

Experience has shown that while leaving helicopter rotor 22 in its operable position during fixed-wing mode would indeed cause substantial drag on convertiplane 10, the instability which would be caused by folding three of the four blades at a time when the folding mechanism for the fourth blade was inoperative could indeed cause such severe stability problems that it would be preferable to leave all four blades in operable position. Accordingly, it is an important teaching of this invention to provide mechanism and method which will present symmetric blade patterns on opposite sides of the helicopter centerline 60 during all phases of conversion and in which all helicopter blades will fold synchronously either in unison or selectively in diametrically opposed pairs.

By viewing FIG. 1, it will be noted that blades #1 and #3 fold from their FIG. 1 solid line position in a counterclockwise direction to their FIG. 1 phantom position, while blades #2 and #4 fold in a clockwise direction from their FIG. 1 solid line position to their FIG. 1 phantom position. Accordingly, blades #1 and #4 fold in opposite rotary directions forward of axis 34 while blades #2 and #3 fold in opposite rotary directions aft of axis 34.

Referring to FIGS. 2 and 3 we see helicopter lift rotor 22 in greater particularity. Rotor 22 is driven in rotation about axis 34 by an appropriate engine 40 and drives rotor drive shaft 50 through reduction gearing 42. Shaft 50 is mounted for rotation about axis 34 in conventional fashion in reduction gear box housing or helicopter mast 62, which is supported by fuselage 12 and which carries spaced bearings, such as bearings 64, between reduction gear box housing or mast 62 and drive shaft 50, to support shaft 50 and hence rotor 22 concentrically for rotation about axis 34. Rotor 22 includes hub assembly 24, which projects from and which may be made integral with drive shaft 50 and which includes four equally spaced arm members 68, 70, 72 and 74 projecting radially therefrom with respect to axis 34. Each arm member 68–74, as best shown in FIG. 3, includes an upper plate member 76 and a lower plate member 78 which have aligned apertures 80 and 82 therein. Apertures 80 and 82 are concentric about blade fold axis 84. Each of blades 26–32 includes a substantially circular blade root attachment section 86 shown best in FIG. 3.

Folding sleeves 90 connect blades 26–32 to arm members 68–74. Each folding sleeve 90 includes an outer end 92 of substantially circular cross section and a bifurcated inner end 94 which includes top plate 96 and bottom plate 98. Outer end 92 envelops cylindrical blade root attachment section 86 to form annular aperture 100 therebetween. Anti-friction bearings 102 and 104 extend between these two members to support the blades for rotation about pitch change or feathering axis 106. Retainers 108 and 110 coact with bearings 102 and 104 and spacer 112 to retain blades 26–32 in position within folding sleeves 90. Bifurcated arms 96 and 98 of sleeve 90 include aligned apertures 114 and 116, which are concentric about blade fold axis 84 and in alignment with aligned apertures 80 and 82 of hub assembly arms 76 and 78 to receive blade fold hinge pin 120 therethrough. Nut 122 holds hinge pin 120 within apertures 80, 82, 114 and 116. It will therefore be seen that blades 26–32 are free to pivot about blade fold axis 84 with respect to hub assembly 24 between their operable and stowed positions shown in FIG. 1.

Figure 6:
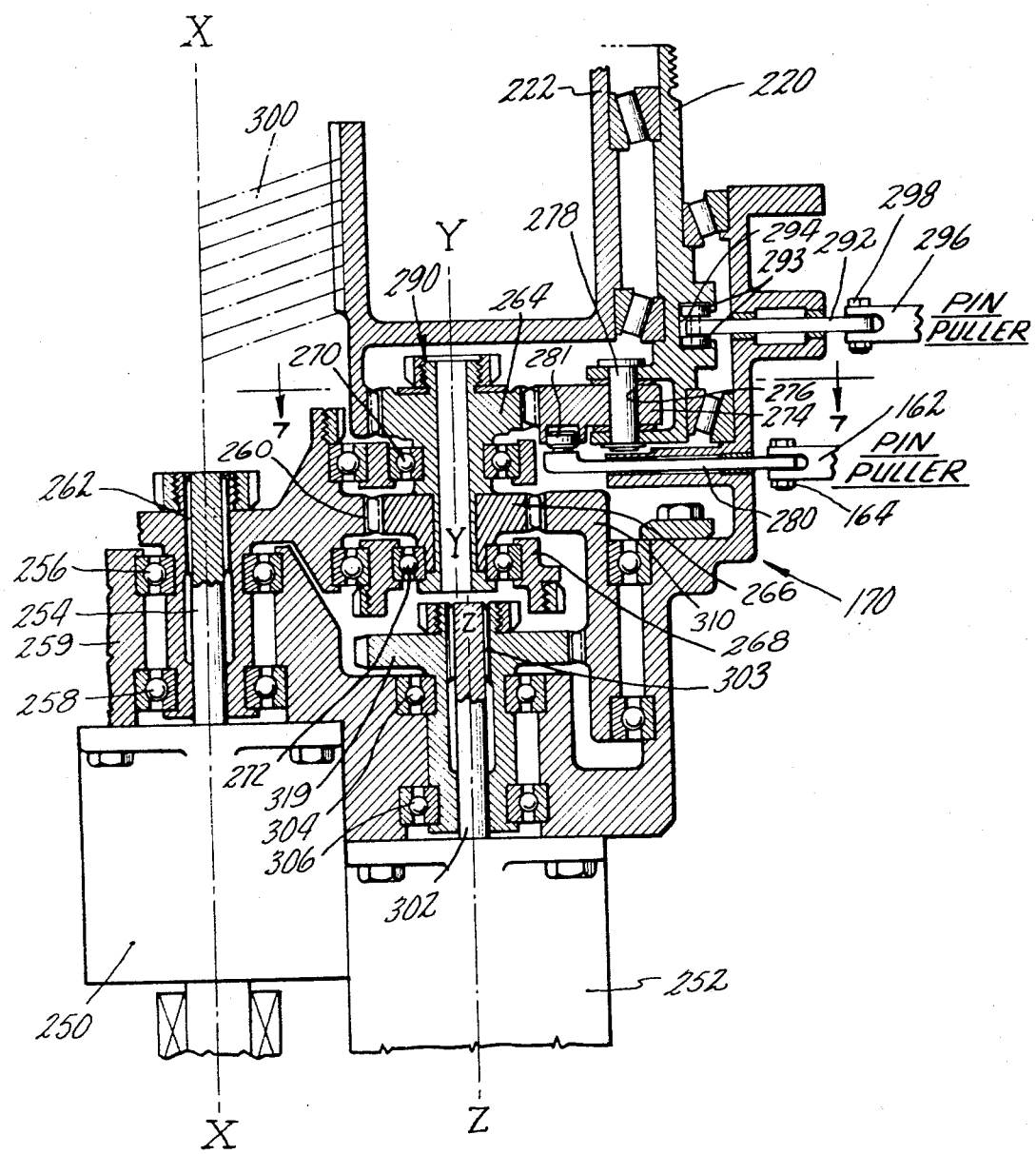
FIG. 6 is a cross-sectional showing of the drive mechanism of the blade fold actuator.

Blade anti-fold locking means 130 is provided in each arm member 68–74 to prevent blade folding when blade folding is not desired. Lock units 130 include pin members 132 and 134 which may be inserted into aligned apertures 136 and 138 of plate members such as 76 and 78 and apertures 140 and 142 of folding sleeve members 96 and 98. Retaining pins 132 and 134 are pivotally connected at pivot connections 144 and 146 to crank members 148 and 150 respectively. Crank members 148 and 150 are, in turn, connected at pivot points 152 and 154 to lug members 156 and 158 which are attached to plate members such as 76 and 78. Crank members 148 and 150 are also pivotally connected at pivot point 160 to actuator link 162, which link is pivotally connected at its opposite end on blade fold actuator 170. Blade fold actuator 170, which will be described in greater particularity hereinafter in connection with FIG. 6, is mounted within hub assembly 24 concentrically about axis 34. It will therefore be seen that as actuator arm 162 is caused to translate, pins 132 and 134 may be caused to either be inserted into or withdrawn from apertures 140 and 142 of folding sleeve 90 so as to either lock the blades 26–32 from folding pivot action with respect to hub assembly 24 or to permit such folding action.

In conventional fashion, and as best shown in FIGS. 2 and 3, the pitch of blades 26–32 may be caused to vary collectively or cyclically by the use of swash plate assembly 172. Swash plate assembly 172 comprises non-rotating section 174 and rotating section 176, which are joined by ring bearing 178. Pitch change link 180 is pivotally connected at its opposite ends 182 and 184 to swash plate assembly 172 and pitch change horn 186, which extends from and which is connected to blades 26–32. Pitch change horn 186 is connected to blades 1 through 4 by a ring of bolts 187. Connector 190 is fastened to the inside of the blade through the same set of bolts. At the outboard end of the connector 190 a spool 189 is bolted by a pin 191. A tension-torsion strap 193 is attached over the spool and around a like spool 195 at the hinge pin 120. This tension-torsion strap is used to take out the centrifugal force of blades and acts in place of a series of stack bearings between sleeve 90 and blades 1 through 4.

Accordingly, motion of swash plate assembly 172 will cause pitch change motion of blades 26–32 due to the connection therebetween through pitch change links 180. As best shown in FIG. 3, stationary scissors 200 are pivotally connected to the reduction gear box housing 62 and to the swash plate nonrotating section 174 to prevent rotation of section 174. Rotating scissors 202 are pivotally connected to hub assembly 24 and the rotating swash plate section 176 to cause that section of the swash plate to rotate with the hub assembly. At least three in-line servos 210 are of conventional hydraulic cylinder-piston design are provided to actuate the same number of swash plate tilt links 212, which are pivotally attached to the stationary portion 174 of swash plate assembly 172 at pivot point 214. Accordingly, in conventional fashion, when all in-line servos 210 are actuated in unison, swash plate 172 is caused to either raise or lower without tilting on reduction gear box housing 62 so as to collectively vary the pitch of blades 26–32 in unison. Also in conventional fashion, if the three or more in-line servos 210 are actuated independently of one another or different amounts, swash plate 172 will tilt, thereby providing cyclic blade pitch variation.

As previously stated, the purpose of this invention is to provide means and method for folding the helicopter blades relative to the remainder of the helicopter rotor in such a fashion that the stability of the aircraft is adversely affected minimally during the in-flight blade folding operation and wherein the folded blades present minimum drag. It is an important teaching of this invention that the helicopter blades be folded such that at all times during the folding process a symmetric blade pattern is presented on opposite sides of the fore-and-aft centerline of the helicopter. This can be done by either synchronously folding the blades simultaneously and in unison or by sequentially folding selected pairs of blades. There are some helicopter rotor configurations in which blade lead-lag and flapping motion is minimal wherein there is no danger of blade-to-blade or blade-to-fuselage interference if all blades are folded synchronously and in unison and the actuators for such systems will be discussed hereinafter in connection with the discussion of the actuator embodiments shown in FIGS. 4 and 5. There are other helicopter rotor assemblies, however, in which the blades are sufficiently susceptible to both flapping and lead-lag and other motions due to the aerodynamic loading thereof during folding that either blade-to-blade or blade-to-fuselage interference could be expected and therefore it is deemed desirable to fold diametrically opposed blades in synchronization but sequentially. The blade folding mechanism shown in FIGS. 2 and 3 is of the latter variety and will now be described.

Blade fold actuator 170, the operation of which will be described hereinafter in connection with FIG. 6 is positioned within hub assembly 24 and concentrically about axis 34 and for rotation with hub assembly 24. Actuator 170 serves to drive output shafts 220 and 222, which carry actuator heads 224 and 226, respectively. As best shown in FIG. 2, actuator head 224 has oppositely projecting lobes 228 and 230 which are pivotally connected to blade fold link or rods 232 and 234, respectively. Rods 232 and 234 are pivotally connected at their opposite ends to blade fold projections 236 and 238 extending from the folding sleeves 90 of blades #1 and #3, respectively. It will accordingly be seen that when actuator head 224 is rotated in a counterclockwise direction as shown in FIG. 2, fold rods 232 and 234 will act through blade fold lugs 236 and 238 to synchronously fold blades #1 and #3 between their FIG. 1 solid line operating position to their FIG. 1 phantom line folded positions.

In similar fashion, actuator head 226 has oppositely directed lobes 240 and 242, which pivotally connect at their opposite ends to blade fold links 244 and 246, respectively. Links 244 and 246 pivotally connect to the blade fold ears 248 and 250 being part of folding sleeve 90 of blades #4 and #2, respectively. It will accordingly be seen that as actuator 226 is caused to rotate counterclockwise as shown in FIG. 2, blades #2 and #4 will be caused to fold synchronously. Obviously, clockwise direction of actuators 224 and 226 will cause the respective blades to move from their folded to their operable position. It will be observed that with the blade folding actuation system shown in FIGS. 2 and 3, blades #1 and #3 may be folded independently and sequentially with respect to blades #2 and #4.

Bearing in mind the blade fold actuation system just described in connection with FIGS. 2 and 3, it will be noted by observing FIG. 1 that with such an actuation system, blades #1 and #3 can be synchronously folded to their stowed position and that, thereafter, once blades #1 and #3 are folded and stowed, blades #2 and #4 may then be synchronously folded to their folded position. In this fashion, there will be no blade overlapping due to blade flexibility and other motions during the blade folding process and hence blade damage during in-flight folding will be eliminated.

With respect to the stowed position of the rotor blades, by proper selection of the location and attitude of the folding axis 84 and the number of degrees through which the blades fold, the blades may be selectively positioned in the desired stowed position. In our FIG. 2 and FIG. 3 blade fold construction, we control the angle through which the blades move in folding by providing adjustable position stops 91 and microswitch 93 on the rotor hub (see FIG. 2).

In addition to control of the location and attitude of the blade fold axis 84 and the number of degrees through which the blades move in folding, it is often of assistance in snugly stowing blades to be able to produce a motion in the stowed blades which constitutes a pitch change motion only. This is possible through the usual pitch change mechanisms, that is, the swash plate 172 and connecting links 180 so long as the feathering axis 84 are positioned closer to axis of rotation 34 than are the pitch change connections between the blade and the hub shown at bearings 102 and 104 of FIG. 3. This particular positioning of the fold axis and the pitch change connection between the blades and the hubs is another advantage of this invention, since it permits pure pitch change motion of the blades when in their stowed positions.

Figure 7:
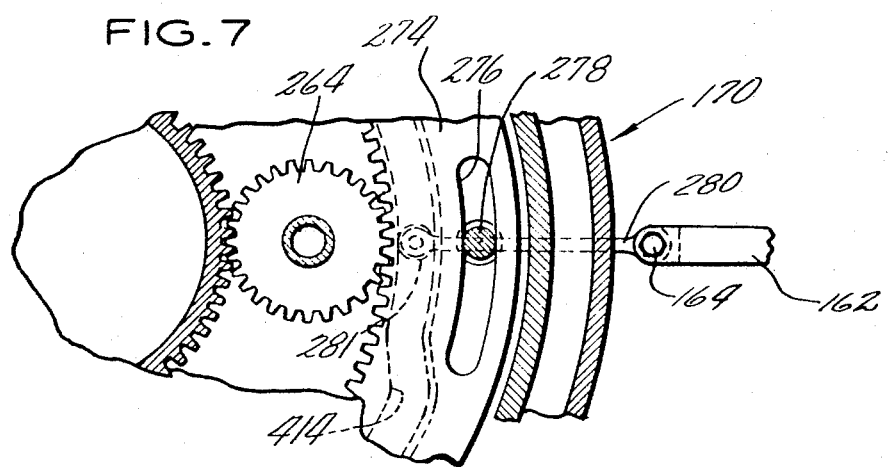
FIG. 7 is a section through line 7—7 of FIG. 6.

FIG. 6 shows our preferred embodiment of the mechanism for causing the blade fold mechanism of FIGS. 2 and 3 to operate so as to sequentially unlock and fold blade pairs. The FIG. 6 actuator system is actually redundant in that it may be driven either by input motor 250 or 252. In operation, input motor 250 causes shaft 254, which is supported for rotation by bearings 256 and 258 within housing 259, to rotate about axis of rotation X—X. Sun gear 260, which is either integral with or splined to rotating shaft 254 by spline 262, is also caused to rotate about axis X—X. This rotation of sun gear 260 causes a plurality of planetary gears, each of which includes two gears such as 264 and 266 to rotate about their own axis Y—Y, and also in planetary fashion about axis X—X. Planetary gears 264 and 266 are carried in cage 268, which supports bearings 270 and 272 and are joined as a double gear with gears 264 and 266 mounted for relative rotation. The rotation of planetary gears 264 and 268 will cause ring gear 274 to commence to rotate about axis X—X because output shaft 222 is still locked in position by pins 132 and 134, respectively. This rotation of ring gear 274 is initially permitted for a selective number of degrees because ring gear 274 includes circumferential slot 276 (see FIG. 7) through which pin 278 passes to form a lost motion connection between ring gear 274 and output shaft 220. Accordingly, ring gear 274 is free to rotate through a few degrees before it begins to drive output shaft 220. During the first few degrees of rotation, ring gear 274 actuates lock mechanism 130 (FIG. 3) for blades #1 and #3 through spring loaded plunger 280 which is pivotally connected to pin puller link 162 at 164. The plunger 280 carries a roller 281 which is retained in contoured cam ring 414. Ring 414 is attached to ring gear 274 by any convenient connecting means such as screw 416. As ring gear 274 rotates in its lost motion movement, cam ring 414 causes plunger 280 to translate link 162 and actuate the pin retraction mechanisms 130 of blades #1 and #3 to unlock these blades for folding. After blades #1 and #3 are unlocked, pin 278 bottoms against the end of circumferential slot 276 in ring gear 274, thereby causing output shaft 220 to rotate with ring gear 274 so as to cause link actuator 224 to rotate and cooperate with blade fold links 232 and 234 to fold blades #1 and #3 to their stowed position (FIG. 1). It will therefore be seen that input motor 250 of FIG. 6 drives a planetary gear system indicated generally as 290 to first pull the lock pins of blades #1 and #3 and then fold those blades while blades #2 and #4 remain in their unfolded or operable FIG. 1 solid line position.

Still viewing FIG. 6 it will be noted that plunger member 292 attached to double cam roller 293 is received in cam slot 294 of shaft 220 and this cam slot is selectively contoured so that the rotation of output shaft 220, after folding blades #1 and #3 will act upon pin puller plunger 292 so as to pull the lock pins of blade lock mechanisms 130 of bades #2 and #4 through the coaction of pin puller link 296 which is pivotally attached thereto at pivot point 298. Pin puller link 296 is connected to blade lock units 130 for blades #2 and #4 and serves to unlock those blades for blade folding. With blades #2 and #4 so unlocked, and with output shaft 220 and ring gear 274 stationary because blades #1 and #3 are now stowed, planetary gear system 290 now drives output shaft 222, which is attached to blade fold actuator member 226 and thereby causes rotation thereof. Member 226, through fold links 244 and 246, will cause blades #2 and #4 to fold synchronously to their stowed position shown in FIG. 1.

It will accordingly be seen that the FIG. 6 actuator construction is capable of operating through input 250 so as to sequentially pull the lock pins of blades #1 and #3, then fold blades #1 and #3, then pull the lock pins of blades #2 and #4, and then finally fold blades #2 and #4.

Jackscrew arrangement 300 may be threadably attached to the inner diameter of shaft 222 and may be used for the purpose of raising or lowering a fairing or canopy which is to cover the rotor head area and which must be removed to permit blade unfolding. Jackscrew 300 can be used to produce either a rotary output or a linear output in conventional position. The fairing is lowered as the last two blades #2 and #4 are folding and covers the rotor head area. The fairing is raised as the first two blades are unfolded.

As mentioned previously, blade folding actuator 170 is redundant and, in addition to being actuatable by input motor 250 is also actuatable by input motor 252. These two motors act separately in a truly redundant system and are not cooperative in that they coact. Under the circumstance where input motor 252 is being utilized, shaft member 302 is caused to rotate about axis Z—Z, which shaft member is supported for rotation within housing 170 by bearings 304 and 306. Shaft 302 carries gear member 319 therewith connected by spline 303, which gear drives the planetary gears such as 264 and 266 through ring gear 310. These planetary gears 264 and 266 then act through ring gear 274 in the same fashion as described above in connection with input system 250 so as to sequentially pull the pins of blades #1 and #3, then fold blades #1 and #3, then pull the pins of blades #2 and #4 and, finally, fold blades #2 and #4.

Figure 4:
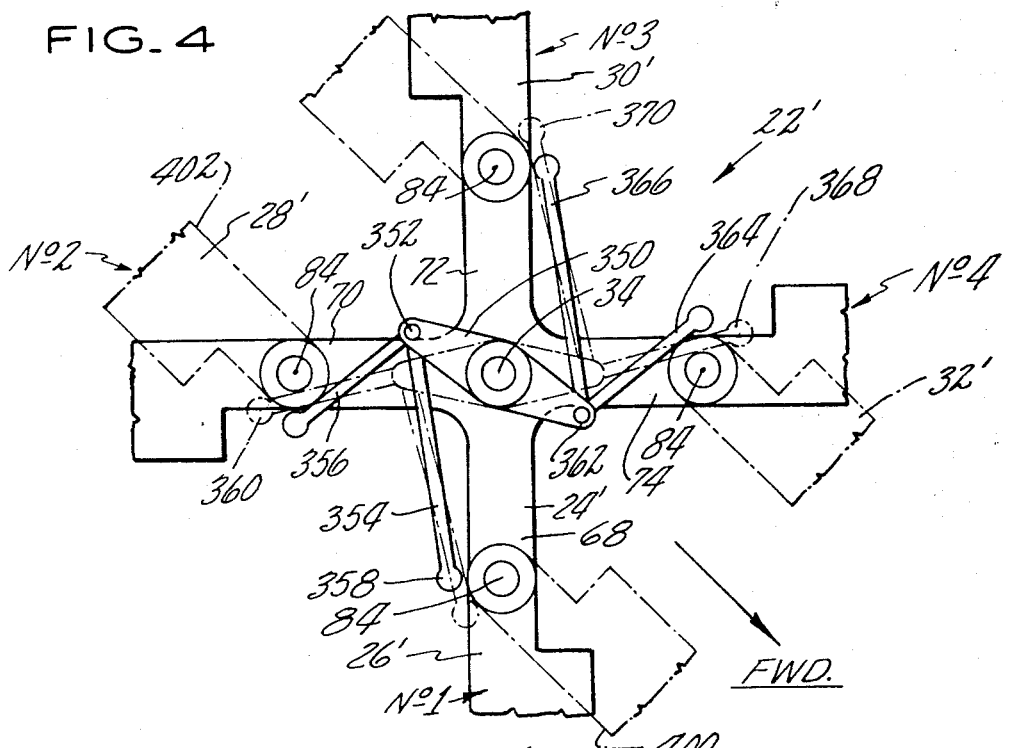
FIG. 4 is a plan view of a modification of the blade fold actuator.

Referring to FIG. 4 we see an embodiment of this rotor head invention with blade fold provisions wherein all four blades synchronously fold simultaneously. In the FIG. 4 construction, rotor hub 24' includes equally spaced arm members 68–74. In conventional fashion, blades 26'–32' are pivotally connected thereto at flapping hinge 84. Pivotable actuator 350 is supported on hub 24' for pivotal motion relative thereto and can be driven in any convenient fashion such as by an electric motor driven rack and gear arrangement (not shown). The first end 352 of actuator 360 is pivotally connected to links 354 and 356 whose other ends are, in turn, pivotally connected to blades #1 and #2, respectively, at pivot points 358 and 360. The other end 362 of actuator 350 is pivotally connected to links 364 and 366, which are in turn pivotally connected at their opposite ends at pivot points 368 and 370 to blades #4 and #3, respectively. It will accordingly be seen that with the arrangement shown in FIG. 4, rotation of actuator 350 in a counterclockwise direction will cause blades 1, 2, 3 and 4 to fold simultaneously and in synchronization and that rotation of link 350 in a clockwise direction will cause all four blades to unfold and come to their operable position simultaneously and in synchronization.

In connection with FIG. 4, it should be noted that links 354 and 356 are connected to blades #1 and #2 so that these blades are caused to fold in opposite directions of rotation. More specifically, since link 354 connects to blade #1 at a point opposite fold axis 84 from leading edge 400 and link 356 connects to blade #2 at a point on the same side of fold axis 84 as leading edge 402, the rotation of actuator 350 will fold blades #1 and #2 in opposite rotary directions.

Links 364 and 366 are similarly so connected to blades #4 and #3 so that these blades fold in opposite rotary directions. It will therefore be seen that blades #2 and #3 fold toward one another aft of axis 34 while blades #1 and #4 fold toward one another forward of axis 34.

Figure 5:
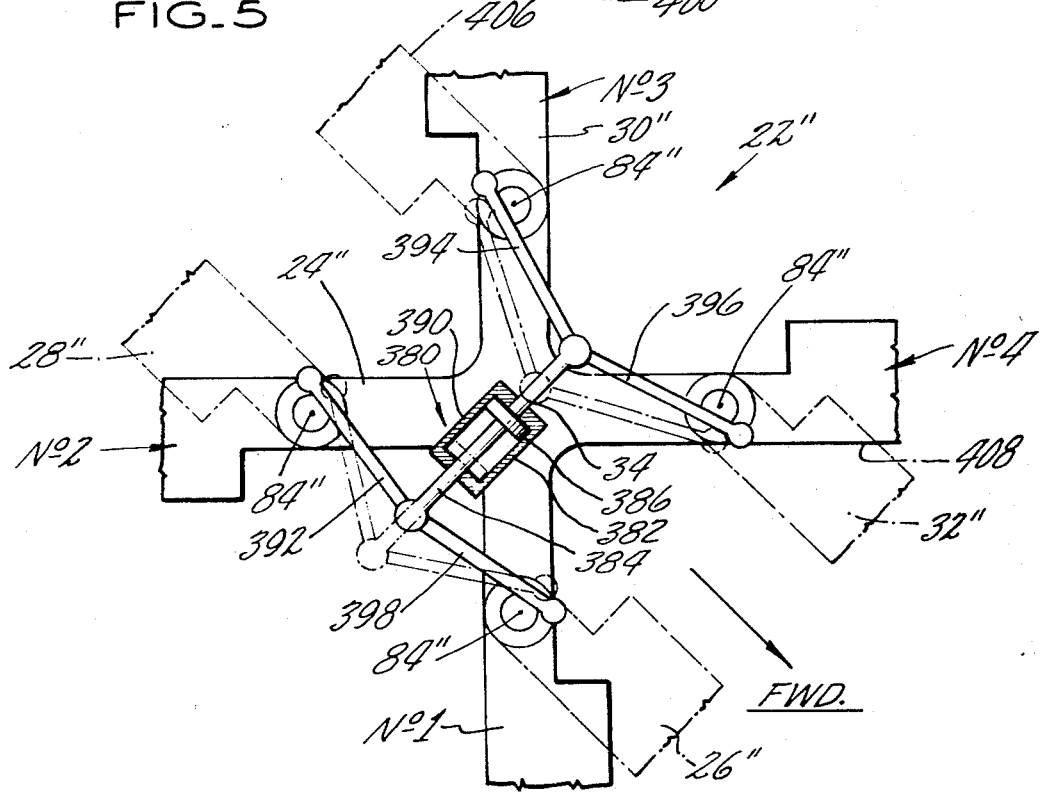
FIG. 5 is still another modification of the blade fold actuator.

Referring to FIG. 5 we see another embodiment of the blade fold actuator which accomplishes simultaneous, synchronous folding of all four blades of the helicopter rotor. In this rotor configuration, blades #1–4 are pivotally attached to rotor hub assembly 24" about fold axes 84" in the same fashion as in the previous constructions. The blade fold actuation system 380 includes a piston-cylinder assembly 382, which may be either hydraulically or pneumatically actuated in either direction in conventional fashion, so as to cause rod 384, which extends in opposite direction from both sides of piston 386 to reciprocate between its end positions of travel as determined by the amount of travel and location of piston 386 within cylinder 390. Links 392, 394, 396 and 398 are pivotally attached as shown in pairs to opposite ends of rod 384 and are pivotally attached at their opposite ends to blades #2, #3, #4 and #1, respectively. In the FIG. 5 construction, when actuator 380 is in its phantom line position, all four blades are in their folded position as shown in phantom lines, whereas, when actuator 380 is in its solid line position, all four blades are in their operable or extended position as shown in solid lines. It will accordingly be seen that the FIG. 5 actuator 380 in the FIG. 5 rotor construction is capable of folding all four blades simultaneously and in synchronization.

It will be noted that blades #3 and #4 are caused to fold in opposite rotary directions since links 394 and 396 pivotally attached thereto on opposite sides of the fold axis 84" from the blade leading edges 406 and 408, respectively. The same relationship exists between links 392 and 398 and blades #2 and #1 so as to cause these two blades to fold in opposite rotary directions. Accordingly, in the FIG. 5 construction, blades #1 and #4 fold toward one another forward of axis 34 and blades #2 and #3 fold toward one another aft of axis 34. Since these blades fold synchonously and in unison, a symmetric blade pattern is maintained on opposite sides of the helicopter centerline at all times during the folding process.

Operation

In operation, our convertiplane 10 shown in FIG. 1 would take off in its fixed-wing mode of operation with the helicopter rotor 22 in its stowed position. To convert from the fixed-wing mode of operation to the helicopter mode of operation, the canopy or fairing covering the stowed rotor (not shown) would first be removed by any convenient mechanism, such as the jackscrew arrangement 300 shown in FIG. 6, and the helicopter blades could then be actuated by means of any of the actuation systems, such as the system shown in FIG. 6 to their operable positions and then locked by locking mechnism 130 against folding with respect to rotor hub assembly 24. During this portion of the operation brake member 52 would probably be used to hold rotor 22 in fixed position. With the rotor blades so extended, helicopter rotor drive engine 40, acting through reduction gear 42 would be caused to drive rotor 22 once brake 52 was released. If engines 18 and 22 were performing no function with respect to the driving of helicopter rotor 22, these engines would preferably be stopped.

In converting from the helicopter mode of operation to the fixed-wing mode of operation, power is transferred from rotor 22 to conventional engines 18 and 20. Rotor 22 is brought to a stop by blade pitch variation or braking, or both, in conventional fashion. With the rotor so stopped, auxiliary motor 44, through rack and gear 46–48, would cause rotor 22 to rotate to its FIG. 1 solid line position so as to present symmetric blade patterns on opposite sides of the helicopter centerline 60. In this FIG. 1 solid line operable position, it will be noted that blades #1 and #4 are at equal arcuate distances on opposite sides of axis 60 and projecting in a generally forward direction while blades #2 and #3 are at equal arcuate distances on opposite sides of axis 60 and projecting in a generally rearward direction. This provides us with the aforementioned symmetric blade pattern. Whether the blades are to be folded by the actuation system shown in FIGS. 2 and 3, or by the actuation systems shown in FIGS. 4 or 5, the four blades will always be brought to the FIG. 1 solid line position initially in the fashion just described.

If all blades are to be synchronously folded simultaneously using the FIG. 4 actuator construction, actuator 350 will be caused to rotate in a counterclockwise direction so as to synchronously fold all blades simultaneously.

If the blade fold actuator 380 of FIG. 5 is to be used, piston 386 and link or rod 384 will be hydraulically or pneumatically translated to its phantom line position of FIG. 5, there synchronously folding all blades simultaneously.

If, on the other hand, diametrically opposed pairs of blades are to be synchronously folded in sequence, the fold mechanism illustrated in FIGS. 2 and 3 and 6 will be used, wherein actuator 170 first pulls the pins of blades #1 and #3 and then causes actuator 224 to rotate in a counterclockwise direction to fold the blades #1 and #3. With blades #1 and #3 so folded, actuator 170 then pulls the pins of blades #2 and #4 and then folds them by counterclockwise rotation of actuator 226. It will be noted that when using the FIGS. 2, 3 and 6 actuator, blade pair #1 and #3 first fold in synchronization and are stowed while blade pair #2 and #4 remain extended. Since there are two such blades presenting a uniform blade pattern at all times, the aircraft stability is not adversely affected thereby. After the second pair of blades #2 and #4 are stowed, the helicopter is then in its FIG. 1 phantom line, stowed position and, after any required pure blade pitch motion to place the blades in a better stowed position, the canopy or other fairing may be used to cover the stowed blades so as to reduce aircraft drag.

It is to be understood that the invention is not limited to the specific embodiment herein illustrated and described but may be used in other ways without departure from its spirit as defined by the following claims.

I claim:
1. In a helicopter rotor including:
    (a) a hub assembly mounted for rotation about an axis,
    (b) a first plurality of blades pivotally attached to said hub assembly for folding motion with respect thereto between operation and folded positions,
    (c) a second plurality of blades pivotally attached to said hub assembly for folding motion with respect thereto,
    (d) first lock means locking each of said first plurality of blades with respect to said hub assembly against folding motion,
    (e) second lock means locking said second plurality of blades with respect to said hub assembly against folding motion,
    (f) blade unlocking and folding mechanism including:
        (1) a housing mounted for rotation with said hub assembly,
        (2) a first output shaft mounted for rotation within said housing,
        (3) means connecting said first output shaft to said first blade plurality to cause blade folding motion in response to rotation of said first output shaft,
        (4) a second output shaft mounted for rotation within said housing,
        (5) means connecting said second output shaft to said second blade plurality so that the blades of second blade plurality will move in blade folding motion in response to rotation of said second output shaft,
        (6) a planetary gear system mounted in said housing and connected to said first and second output shafts and including:
            (A) a sun gear mounted for rotation,
            (B) at least one planetary gear engaging and mounted for planetary motion about said sun gear engaging said first and second output shafts and also engaging said sun gear to be driven thereby,
            (C) a ring gear engaging said planetary gear and including a circumferential slot of selected arcuate dimension therein,
            (D) a pin member connected to said first output shaft and extending through said slot for motion therewithin to provide limited lost motion between said ring gear and said first output shaft and to provide positive drive between said ring gear and said first output shaft when said pin abuts either end of said slot when said lost motion movement has been completed,
        (7) first means driving said sun gear to thereby cause said planetary gear and said ring gear to rotate a selected amount in lost motion movement due to the coaction between said ring gear circumferential slot and said pin with said first and second lock means operative,
        (8) means connected to said ring gear and to said first lock means to unlock said first lock means and hence free said first blade plurality for folding in response to the lost motion rotary movement of said sun gear thereby causing said first plurality of blades to be unlocked for folding before said pin engages one of the ends of said slots to thereby place said first output shaft in driven relation with respect to said ring gear so that further rotation of said ring gear causes rotation of said first output shaft and hence folding of said first blade plurality,
        (9) means responsive to the rotation of said first output shaft to release said second lock means and hence free the blades of said second blade plurality for folding motion,

(10) positive stop means to stop further rotation of said first output shaft when said blades of said first blade plurality are in their folded position, thereby also preventing rotation of said ring gear and so that said first drive means now drives said sun gear and planetary gear and, in cooperation with said ring gear in its fixed condition, now cause said second output shaft to rotate and thereby cause the blades of said second blade plurality to fold,

(11) second drive means to drive said planetary gear and hence said ring gear and output shafts independent of said first drive means and said sun gear in redundant fashion.

2. Apparatus according to claim 1 wherein said means to unlock said second lock means includes a spring loaded plunger which is cam actuated by a cam responsive to the rotation of said first shaft.

3. Apparatus according to claim 2 wherein said cam is mounted for rotation on said first output shaft.

4. An actuator including:
(a) a first output shaft mounted for rotation,
(b) a second output shaft mounted for rotation,
(c) a planetary gear system connected to both of said shafts and including:
 (1) a sun gear mounted for rotation,
 (2) a plurality of planetary pinion gears mounted for rotation within a cage and engaging said sun gear to be driven thereby,
(d) a ring gear enveloping said planetary pinion gears and in gear engagement therewith and including a circumferential slot of selected dimension therein,
(e) pin means connected to said first output shaft and extending through said slot in said ring gear so as to permit a selected amount of relative rotary lost motion between said ring gear and said output shaft and so as to place said ring gear and said output shaft into driving relation when said pin member reaches either end of said ring gear slot,
(f) first means to drive said sun gear and hence said planetary gears and hence said ring gear in rotary lost motion as said pin moves freely in said slot and to produce a first rotary output when said lost motion is completed and said ring gear drives said first output shaft,
(g) means connected to said ring gear to produce a first linear output as said ring gear rotates in lost motion,
(h) means responsive to the rotation of said first output shaft after said pin member reaches the end of said slot and causes said first output shaft to be driven by said ring gear to produce a second linear output motion,
(i) means to stop said ring gear after said second linear output motion takes place so that said drive means, said sun gear and said planetary gears then drive said second output shaft to produce a second rotary output motion.

5. Apparatus according to claim 4 and including a second drive means connected to drive said planetary gears independent of said first drive means and said sun gear.

6. Apparatus according to claim 4 wherein said sun gear, said ring gear, said cage and said first and second output shafts are mounted for rotation about a single axis of rotation and wherein said planetary gears are mounted in said cage for rotation therewith and about their own axes in planetary fashion, and wherein each of said planetary gears are of double gear construction including a first and second gear and wherein said sun gear engages said first gear of each planetary gear and said ring gear and said second output shaft engages the second gear of said planetary gear and wherein said first and second gears of said planetary gears are joined and mounted for rotation together and for relative rotation.

7. Apparatus according to claim 6 and including a second drive means including a first gear mounted for rotation about its own axis, a second gear enveloping and engaging said first gear to be driven thereby and including a third gear engaging said first gear of each of said planetary gears.

8. An actuator including:
(a) a first output shaft mounted for rotation,
(b) first means to lock said first output shaft in fixed position,
(c) a second output shaft mounted for rotation,
(d) second means to lock said second output shaft in fixed position,
(e) a planetary gear system including:
 (1) a sun gear,
 (2) a plurality of planetary gears engaging said sun gear in pilot relation and mounted for rotation thereabout,
 (3) a ring gear enveloping and engaging said planetary gears in drive relation,
(f) a lost motion mechanism connecting said ring gear to said first output shaft so as to permit selected relative motion therebetween,
(g) means responsive to the lost motion movement of said ring gear to unlock said first lock means to release said first output shaft for rotation,
(h) means to rotate said sun gear and hence said planetary gears with said second output shaft locked and further so as to rotate said ring gear first through said lost motion movement to unlock said first lock means and hence release said first output shaft for rotation and then to engage said first output shaft to drive said first output shaft in rotation,
(i) means responsive to the rotation of said first output shaft to unlock said second lock means to free said second output shaft for rotation,
(j) means to fix said first output shaft in position after being rotated by said ring gear a selected amount so as to fix said first output shaft and hence said ring gear in position so that, with said second output shaft so unlocked and said ring gear fixed in position, said pinions will drive said second output shaft.

9. Apparatus according to claim 8 and wherein said actuator mechanism is redundant and includes a second input member including a gear member engaging said planetary gears in driving relation.

10. Apparatus according to claim 9 wherein said lock release means are cam actuated plungers.

11. A redundant actuator comprising:
(a) a fixed housing of circular cross section and concentric about an axis,
(b) a first output shaft concentric about said axis and mounted for rotation within said housing,
(c) first means to lock said first output shaft in fixed position,
(d) a second output shaft of circular cross section and concentrically located within said first output shaft,
(e) second means to lock said second output shaft in fixed position,
(f) a planetary gear system located within said housing and concentric about said axis and including:
 (1) a sun gear mounted for rotation about said axis,
 (2) a cage concentric about said axis,
 (3) a plurality of planetary gears mounted for rotation in said cage and engaging said sun gear in driving relation,
 (4) a ring gear enveloping said planetary gears and engaging said planetary gears in driving relation,
(g) lost motion means connecting said ring gear to said first output shaft to permit limited rotation of said ring gear relative to said output shaft, (h) means connected to said ring gear and said first lock means to release said first lock means and free said first output shaft for rotation in response to the lost motion movement of said ring gear, (i) first drive means driving said sun gear and hence said planetary gears with said second output gear so fixed so as to initially drive said ring gear in lost motion movement and thereafter, after said lost motion movement has been completed, to directly drive said first output shaft in rotation, (j) first means responsive to the lost motion movement of said first drive means to initially unlock said first lock means and thereby free said first output shaft for rotation, (k) second means responsive to the rotation of said first output shaft to unlock said second lock means to free said second output shaft for rotation, (l) stop means to stop rotation of said first output shaft and hence said ring gear after a selected amount of rotation so that with said ring gear fixed, said first drive means, sun gear and planetary gears will drive said second output shaft in rotation.

12. Apparatus according to claim 11 and including a redundant drive means mounted for rotation within said housing and in driving relation to said planetary gears.

13. Apparatus according to claim 12 wherein said planetary gears are of the double gear type having a first gear engaging said sun gear and said redundant drive means and a second gear engaging said ring gear and said second drive shaft.

14. Apparatus according to claim 13 wherein said first unlock means includes cam and plunger mechanism responsive to the rotation of said ring gear and wherein said second unlock means includes cam and plunger mechanism responsive to the rotation of said first output shaft.

References Cited

UNITED STATES PATENTS

| | | | |
|---|---|---|---|
| 2,385,464 | 9/1945 | Peterson | 170—160.12 |
| 3,097,701 | 7/1963 | Buivid | 170—160.12 |
| 3,106,963 | 10/1963 | Posniak et al. | 170—160.12 |
| 3,158,203 | 11/1964 | Grunfelder | 170—160.12 |
| 3,187,818 | 6/1965 | Barrett et al. | 170—160.12 |
| 3,247,907 | 4/1966 | Mosinskis | 170—160.12 |
| 3,369,611 | 2/1968 | Vacca et al. | 170—160.12 |

EVERETTE A. POWELL, JR., *Primary Examiner.*

UNITED STATES PATENT OFFICE
CERTIFICATE OF CORRECTION

Patent No. 3,438,447                                      April 15, 1969

Donald L. Ferris

It is certified that error appears in the above identified patent and that said Letters Patent are hereby corrected as shown below:

Column 5, lines 66 and 70, column 6, lines 16 and 18, Column 7, lines 2, 10, 11, 16, 19, 26, 34, 43, 44, 72, and 73, column 9, lines 58, 59, 60, and 64, "1", each occurrence, should read -- 2 --. Column 5, lines 66 and 70, column 6, lines 16 and 18, column 7, lines 2, second occurrence, 10, 11, 16, 19, 26, 35, 44, first occurrence, same line 44, second occurrence, 72, and 73, column 9, lines 58, 59, 60, and 64, "3", each occurrence, should read -- 4 --. Column 6, lines 3, 5, and 18, column 7, lines 20, 28, 31, 33, 39, 45, 46, 54, and 74, first and second occurrence, column 9, lines 61, 65, and 69, "4", each occurrence, should read -- 3 --. Column 6, lines 3, 5, second occurrence, and 18, column 7, lines 20, 28, 31, 33, 39, 45, first and second occurrence, 54, and 74, first and second occurrence, column 9, lines 61, 65, and 69, "2", each occurrence, should read -- 1 --. Column 6, line 63, cancel "and are joined as a double gear with gears 264 and 266 mounted for relative rotation". Column 7, line 74, after the period, insert as a new paragraph -- If it is desired to mount gears 274 and 266 for relative motion, it is necessary to provide braking means for motors 250 and 252. The brake would be applied to the inoperative motor in order to fix its associated gear and allow cage 268 to carry gear 264 around axis XX. --. Column 8, line 10, "360" should read -- 350 --. Column 11, line 75 and column 12, lines 1 and 2, cancel "and wherein said first and second gears of said planetary gears are joined and mounted for rotation together and for relative rotation".

Signed and sealed this 5th day of May 1970.

(SEAL)
Attest:

EDWARD M. FLETCHER, JR.                          WILLIAM E. SCHUYLER, JR.
Attesting Officer                                            Commissioner of Patents